Oct. 10, 1950 W. J. PARKER 2,525,718
DEVICE FOR SOWING SEEDS
Filed June 20, 1946 3 Sheets-Sheet 1

Inventor
Wallace James Parker,
By Karl W. Flocks
Attorney

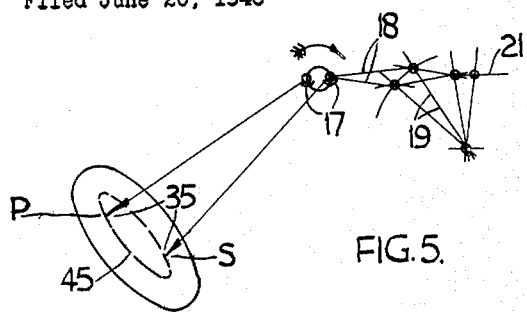
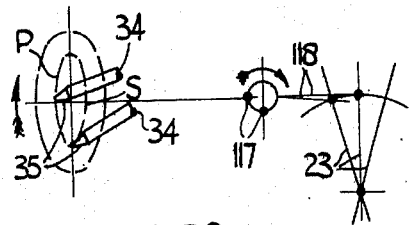
FIG.5.   FIG.9.
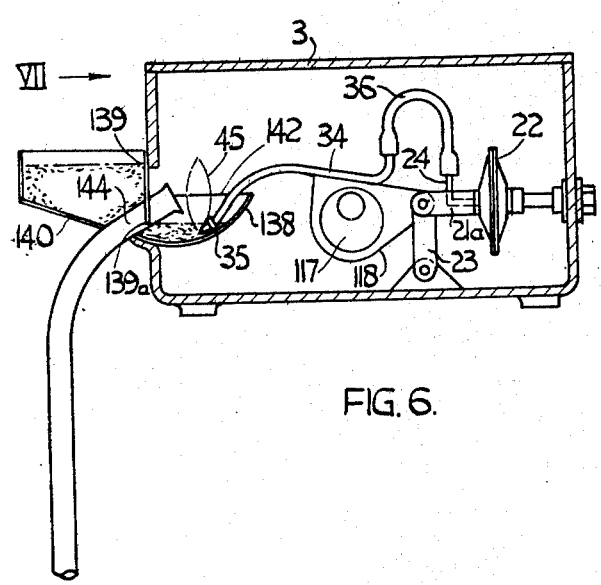
FIG.6.
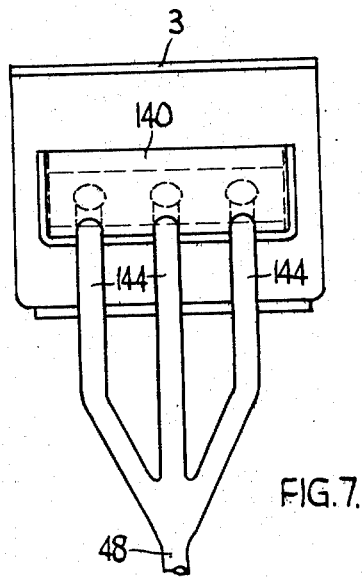
FIG.7.
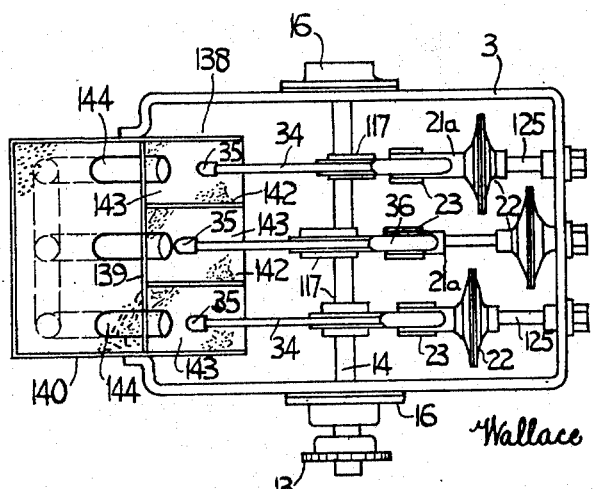
Inventor
Wallace James Parker
By Karl W. Flocks
Attorney
FIG.8.

Oct. 10, 1950     W. J. PARKER     2,525,718
DEVICE FOR SOWING SEEDS
Filed June 20, 1946     3 Sheets-Sheet 3
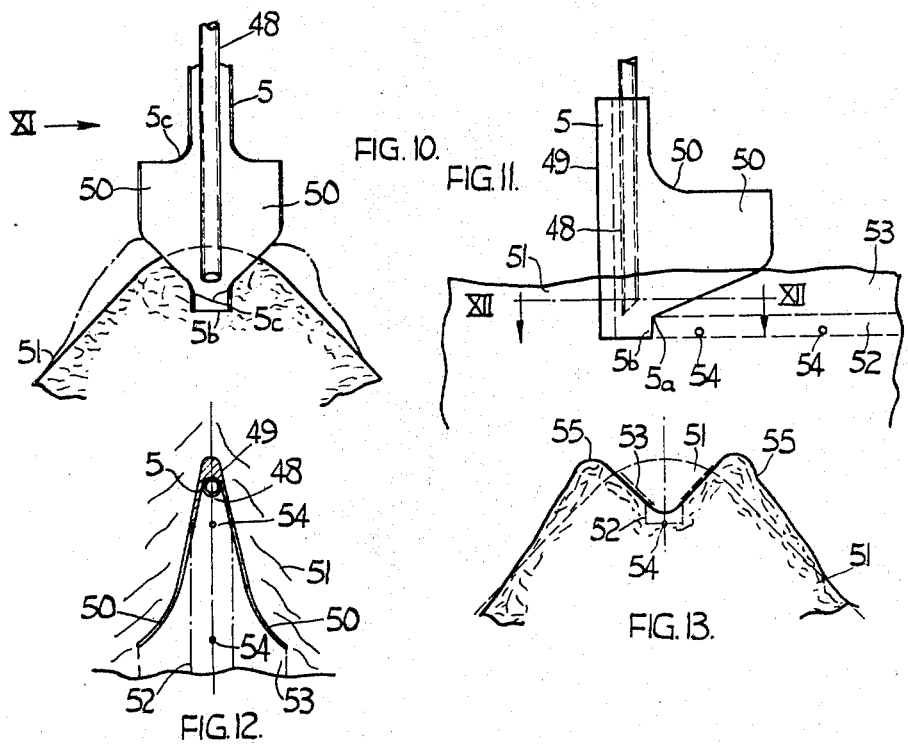
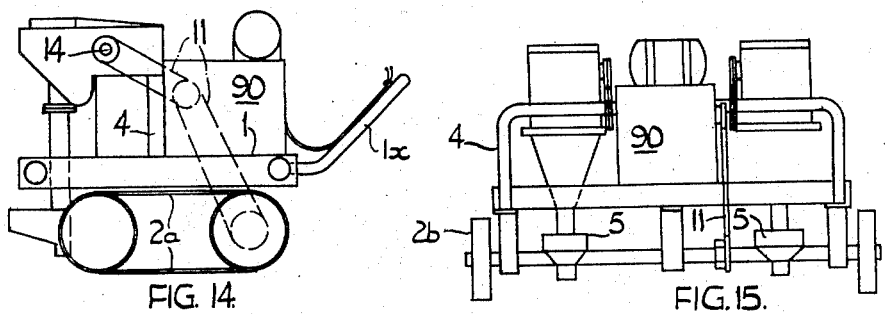
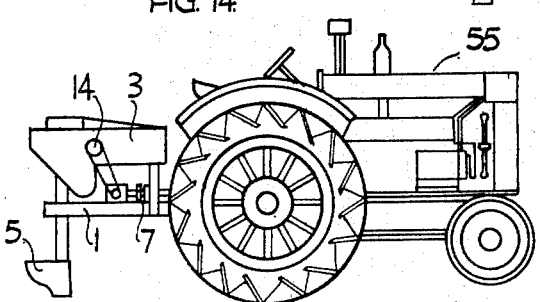

Patented Oct. 10, 1950

2,525,718

UNITED STATES PATENT OFFICE 2,525,718

DEVICE FOR SOWING SEEDS

Wallace James Parker, Stepps, Scotland

Application June 20, 1946, Serial No. 678,086
In Great Britain June 21, 1945

7 Claims. (Cl. 222—11)

1

This invention relates to devices for sowing seeds.

It is known that small seeds which cannot be handled singly are sown in drills in a continuous stream with a consequent requirement for the expenditure of considerable time and labour in thinning the seedlings to the correct distances apart.

The object of the invention is to provide a novel or improved device whereby such seeds may be sown singly at regular intervals dependent solely upon the space required by the plants and the percentage of fertile seeds shown by a germination test. Thus thinning is avoided and all that may be necessary is a final gapping by means of a hoe.

According to the invention, a device for sowing seeds comprises a carrier transportable over the ground and provided with a delivery chute terminating at or near ground level, means on the carrier for holding a supply of seeds, and means for lifting seeds one at a time from the supply thereof and depositing them in the delivery chute.

The delivery chute may comprise a pipe leading to a coulter and the carrier is preferably a closed casing adapted to be mounted on a frame provided with ground-engaging wheels and also supporting the coulter. Most suitably, the means for lifting single seeds is operated by a drive obtained from the ground wheels and comprises an element operable to produce variations of pressure at a nozzle which is itself displaceable from a position in which it dips into the supply of seeds to a position in which it is closely adjacent to the entry to the delivery chute.

The element operable to produce variations of pressure at a nozzle is provided with an additional air inlet port controlled by a one-way valve device. Preferably, the said element comprises a bellows permanently open to the nozzle, and the one-way valve may be connected to the bellows by a pipe entering at the opposite side thereof to the nozzle connection.

A plurality of seed-lifting means may be employed in association with a single delivery outlet in order that the speed of operation of these means may be reduced without extending the time intervals between the deposition of successive seeds.

In order that the nature of the invention may be more clearly understood, there will now be described in greater detail an example of a seed-sowing device constructed in accordance therewith and illustrated in the accompanying drawings in which:

Fig. 5 is a diagram illustrating the motions of certain of the moving parts shown in Figs. 3 and 4;

Fig. 6 is a view similar to Fig. 3 showing a modified construction;

Fig. 7 is an end elevation of the casing of Fig. 6 seen in the direction of the arrow VII;

Fig. 8 is a plan view of the casing of Fig. 6 with the cover removed;

Fig. 9 is a diagram illustrating the motion of certain of the parts shown in Figs. 6 and 8.

Fig. 10 is a fragmentary section taken through a seed drill behind the coulter;

Fig. 11 is a fragmentary side elevation on the arrow XI of Fig. 10;

Fig. 12 is a sectional plan on the line XII—XII of Fig. 11;

Fig. 13 is a cross-sectional view of a seed drill after a coulter has passed along the drill and sown a seed;

Fig. 14 is a side elevation of a modified form of the invention;

Fig. 15 is an end elevation of a further modified form of the invention, and

Fig. 16 is a side elevation of a still further modified form of the invention.

In all figures, like parts carry the same reference numerals.

Figure 1:
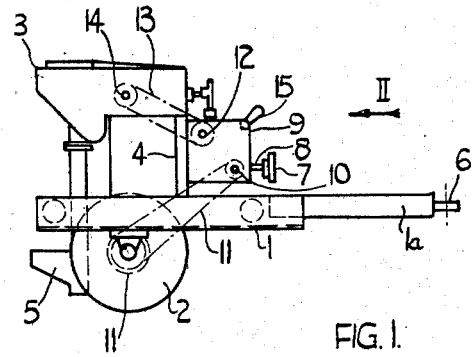
Fig. 1 is a side elevation of a typical machine.
Figure 2:
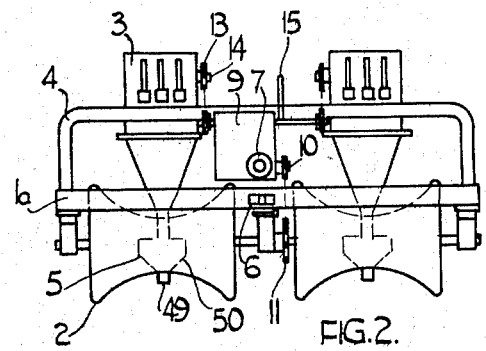
Fig. 2 is an end elevation seen in the direction of the arrow II of Fig. 1.

Referring first to Figs. 1 and 2, the machine illustrated comprises a carrier consisting of a frame 1, preferably constructed from channel section members, which is mounted on concave rollers 2, and a pair of casings 3, in a compartment of each of which the seeds to be sown are carried. The casings 3 are mounted on common supports 4. A pair of coulters 5, of V-shape in plan, depend from the frame in front of the rollers 2 in known manner to form a seed trench. A draw-bar arrangement, indicated generally at 6, is mounted in a sub-frame 1a bolted to the forward ends of the channel members 1. Above the point of attachment of the sub-frame 1a to the channels 1 is located a coupling 7 which is fast on the forward end of a drive shaft 8 whereby the latter can be coupled to a power take-off shaft on a towing tractor (not shown).

The inner end of the drive shaft 8 enters a change-over gearbox 9 in which is mounted a second input shaft 10 driven through chain and sprocket gearing 11 from the shaft of the concave rollers 2. The output shaft 12 is connected by chain drives 13 to a main crankshaft 14 running transversely through each casing 3. A lever 15 projecting from the casing 9 is operative to connect the output shaft 12 alternatively to the input drive shaft 8 or the chain drive input shaft 10, or to select a neutral position in which the output shaft 12 is disconnected from either input shaft.

Figure 3:
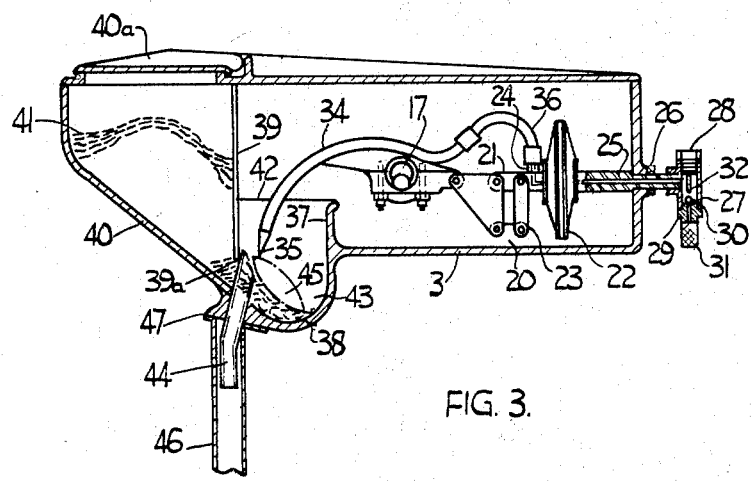
Fig. 3 is a longitudinal sectional elevation of the casing on the line III—III of Fig. 4, showing one nozzle assembly only.
Figure 4:
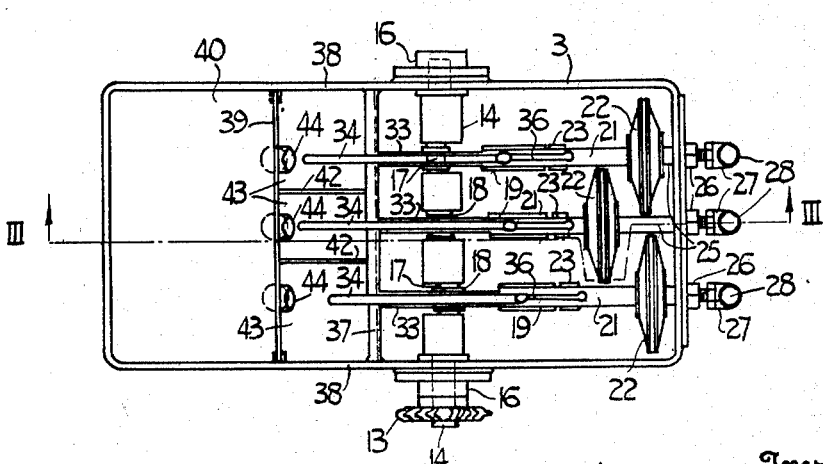
Fig. 4 is a plan view of the casing with the cover removed.

Figs. 3 and 4 illustrate a preferred construction of casing 3 and mechanism mounted therein. The crankshaft 14 is carried in bearings 16 in the sides of the casing 3, and has three short-throw crankpins 17 machined therein at angles of 120° to each other. On each crankpin 17 works a pitman 18 having its forward end articulated by a triangular link 19 to an internal rib 20 on the bottom of the casing 3, the link 19 being set so that in mid-travel of the pitman 18 it stands on one apex with the sides including the right angle lying horizontal and vertical respectively, as shown. The pitman 18 is pinned to the upper end of the inclined hypotenuse of the link 19, whilst at the right angle the link is pinned to the rear end of a rod 21 which is secured at its forward end to one side of a bellows 22. A straight link 23 is also pinned at the top to the rod 21 and at the bottom to the rib 20 and lies parallel to the vertical edge of the triangular link 19. The rod 21 is counterbored axially from the bellows end to a point close to its articulation to the link 23, where it communicates with a radial duct which passes upwards through a nipple 24 secured to the rod 21.

The other side of the bellows is secured to the front wall of the casing by a hollow shouldered rod 25, the reduced diameter end beyond the shoulder passing through a hole in the front wall and being secured by a nut 26. On to the projecting threaded end is screwed a vertical cylindrical non-return inlet valve body 27. The body 27 is of tubular form, closed at the top by a screw plug 28 and internally threaded at its lower end to receive a threaded valve seating member 29 having a through bore terminating at its upper end in a seating for a ball valve 30. The lower end of the valve seating member 29 carries a filter 31. The upward travel of the ball 31 is limited by a stem or pin 32 secured in the screw plug 28.

Each pitman 18 is in two parts, separable on a horizontal plane, the upper part 33 having a curved upper edge to which is secured a "swan neck" tube 34 terminating at its lower end in a nozzle 35, which is pierced with a hole of less diameter than the minimum dimension of the seeds to be sown. At its other end the swan neck is curved upwards for a short distance and is connected to the nipple 24 by flexible tube 36. The swan neck 34 dips over a shallow partition wall 37 into a trough 38 which extends across the full width of the casing 3 and is divided by a rear partition 39 from a hopper 40 containing a supply of seeds 41 and also extending for the full width of the casing 3. The partition 39 terminates at 39a a short distance above the bottom wall of the hopper so that seeds can pass beneath it into the trough 38. The trough is subdivided by transverse partitions 42 into three compartments 43, one opposite each pitman 18, each swan neck 34 dipping into the respective trough compartment. The hopper is fitted with a hinged lid 40a.

Into each compartment 43 projects a short, substantially vertical seed delivery chute 44 having a flared mouth the rim of which is above the natural level of repose of the seeds in the trough 38.

The parts 19 and 34, and the throw of the crank pins 17, are so dimensioned that, as the crankshaft 14 rotates through one revolution and the links 19 and 23 rock about their lower ends, the nozzles 35 trace elliptical paths such as 45 in the vertical planes containing the respective swan necks 34 and pitmans 18. The bottom of each ellipse passes below the natural level of repose of the seeds in the trough 38, whilst the crest passes closely above the mouth of the associated delivery chute 44, so that the nozzle alternately dips into the supply of seeds in the compartment and over the delivery chute.

As the crankshaft 14 is rotated, for example (when the lever 15 on the gear box 9 is in the appropriate position), by means of the drive from the rollers 2 as the machine is towed over the ground, each pitman 18 reciprocates the respective rod 21 to which it is coupled, and this in turn alternately collapses and expands the bellows 22. As will be seen from the diagram of Fig. 5 where the linkages are represented by chain lines, the phases of these successive operations are so arranged that as a nozzle 35 approaches the lowest point in its elliptical path, the bellows begins to expand—say, at the point S—and produces a suction at the nozzle 35, the weight of the ball 30 in non-return inlet valve body 27 being sufficient to hold it on its seating at the top of the member 29 under normal working conditions. As the nozzle travels through the supply of seeds in the compartment 42, a seed is attracted to the nozzle and held there by the suction as the nozzle continues upwards to its position above the delivery chute 44. When it reaches the point P, the pitman is in its rearward dead-centre position, suction at the nozzle ceases, and with further rotation of the crankshaft 14 the bellows begins to collapse. If, when suction ceases, the seed has not already fallen into the delivery chute under its own weight, it is then forcibly expelled thereinto by the rising air pressure in the nozzle.

In the event of the nozzle becoming choked by a particle of foreign matter, or by an undersize seed actually entering and lodging in the bore of the nozzle, the pressure in the bellows during the suction stroke falls below the normal value and the ball 30 lifts to open the non-return valve. The bellows thus becomes charged with the normal amount of air, and on the next pressure stroke the air pressure in the nozzle builds up to a value at which the obstruction is cleared. The ball valve 30 thus prevents an obstruction from being drawn right into the swan neck 34 and facilitates its clearance on the subsequent pressure stroke, thus reducing stoppages and irregularities of operation of the machine to a minimum.

Each delivery chute 44 enters for a short distance into a wide shallow funnel 46 extending for the greater part of the length of the trough 38 and secured to a flange 47 formed on the underside thereof, the funnel terminating, at the top of the coulter 5, in a feed pipe 48 (see Figs. 10–12). The coulter 5 consists of a vertical stem of V-shape in plan open at the rear and having a narrow vertical leading edge 49. A section of each flank of the V, extending upwards from a point 5a a short distance above the bottom edge 5b thereof to a point 5c above the maximum depth to which the coulter is likely to be inserted into the seed drill (which is shown as a low ridge 51) is extended backwards in the form of divergent wing plates 50. As the coulter is drawn through the drill, it forms a shallow trench having a rectangular section channel at the bottom part 52 with upper sloping sides 53.

The action of the machine is as follows:

Seeds are picked up by the nozzles one at a time, as already described, and dropped down the delivery chutes 44, into the funnel 46, whence they fall through the feed pipe 48 into the channel 52 immediately behind the nose 49 of the coulter. The seeds are thus distributed evenly and singly along the channel, as shown at 54 in Figs. 11 and 12, the spacing being determined by the speed of rotation of the crankshaft 14. If it is required to vary this rate of distribution, the gear box 9 may be arranged to incorporate a change-speed device, or one or more of the ball valves 30 may be arranged to be lifted off their seatings so that only one or some of the nozzles is or are operative.

After the coulter has passed along the drill sowing seeds, the walls of the channel 52 crumble and cover the seed. This is due to the heaping up of the mould in front of the coulter as it ploughs through the drill, as shown at 55 in Fig. 13, the dotted curve at 51 showing the original contour of the drill before passage of the coulter. The remainder of the soil in the heaps 55 forms a protective hollow in which the seedlings can develop.

In a modified construction of machine illustrated in Figs. 6 to 9, the mechanism within the casing 3 is simplified, and the non-return inlet valves are omitted. The design of the casing 3 is also modified at the rear end, the rear wall being apertured to receive a combined hopper and trough structure having the hopper part 140 mounted externally of the casing 3, the trough part 138 projecting thereinto. The trough 138 is divided from the hopper 140 by a partition wall 139 which terminates at 139a short of the bottom of the hopper. The trough 138 is subdivided into three compartments 143 by transverse walls 142.

The main shaft 14 carries three eccentric sheaves 117 embraced by eccentric straps 118 to the top edges of which the swan neck tubes 34 are secured. The forward end of each eccentric strap 118 is articulated to the rod 21 and to the top of the straight links 23 by a common pivot pin, the rear end of each rod 21 having a clevis 21a secured thereon to embrace the end of the eccentric strap 118. The bellows 22 are secured to the front casing wall by a bolt or pillar and nut fastening 125.

Three delivery chutes 144 pass through the base of the hopper part 140 and the partition 139 to open, at an angle of about 30° to the horizontal, one in each compartment 143. At their lower ends the chutes 144 unite and continue downwards to form the feed pipe 48.

In this construction, the elliptical paths 45 of the nozzles have their major axes vertical, since, as will be seen from Fig. 9, the forward ends of the eccentric straps 118 are pinned to links 23 which oscillate about a vertical mean position.

In a further modification shown in Fig. 14, a power unit 90 is mounted on the frame 1 in place of the gear-box 9 and is operative to drive the rollers and the main crank or eccentric shaft 14. The frame members 1 may then be curtailed and a guiding handle 1x may be secured to the rear ends of the frame members 1. Alternatively, the frame 1 may be mounted on a caterpillar track 2a (Fig. 14).

Where the machine is to be used for sowing in unfurrowed fields, the rollers 2 can be replaced by ground wheels 2b (Fig. 15), whilst in a further modified arrangement the rollers 2 and the chain and sprocket drive 11 are removed, the sub-frame 1a is unbolted from the channels 1, and the latter are bolted to brackets on a tractor, generally indicated at 55 in Fig. 16, the coupling 7 being connected to a power take-off on the tractor. The casings 3 are then carried on the tractor itself.

In any of the forms of the invention set out above, any number of nozzles may be used as desired, and their sizes may be selected to suit the size of the seeds to be sown.

What I claim is:

1. A seed dispensing device comprising a nozzle, means for reciprocating the nozzle in a closed path between a seed pick-up point and a seed discharge point, a collector for discharged seeds located adjacent the discharge point of the nozzle, a bellows continuously open to the nozzle and mechanically coupled to the said nozzle reciprocating means, and a non-return valve connected to the bellows for the admission of air thereto when the pressure therein falls below a predetermined value.

2. A seed dispensing device comprising a downwardly directed discharge chute, a trough encircling the upper end of the chute below the mouth thereof, means for supplying seeds to the trough to maintain them at a predetermined level around the upper end of the chute, a shaft having an eccentric throw device, a nozzle connected to the eccentric throw device for displacement in a closed path between a lower point located below the level of the seeds in the trough and a higher point located above the mouth of the delivery chute, a bellows mounted with its axis horizontal adjacent the eccentric throw device and connected thereto so as to be collapsed when the nozzle reaches the highest point and expanded when it reaches the lowest point of its displacement, and a flexible pneumatic connection between the bellows and the nozzle.

3. A seed dispensing device comprising a nozzle, means for reciprocating the nozzle between a seed collecting and a seed discharge point, a collector for discharged seeds located adjacent the discharge point, a bellows mechanically connected to the nozzle reciprocating means, a pipe connecting the nozzle to the interior of the bellows, and a one-way valve arranged to admit air to the bellows when the pressure therein drops below a predetermined value.

4. A seed dispensing device comprising a plurality of nozzles, means for reciprocating each nozzle between a seed pick-up and a seed discharge point, a collector for discharged seeds located adjacent the discharge point of each nozzle, a bellows associated with each nozzle, a mechanical connection between the bellows and the nozzle reciprocating means, a flexible pipe connecting each nozzle to the interior of its associated bellows, means for causing each nozzle to perform its cycle of movements out of step with the other nozzles, and a non-return valve connected with the interior of each bellows and arranged to admit air thereto when the pressure therein falls below a predetermined value.

5. A seed dispensing device comprising a container for seeds, a seed trough in permanent communication with the said container, a delivery chute having its mouth located above the level of the seeds in the trough, a seed pick-up nozzle, means for traversing the nozzle in a closed path between a seed pick-up point in the seed trough and a seed discharge point adjacent the mouth of the delivery chute, and a bellows continuously open to the nozzle and directly operated by the nozzle traversing means.

6. A seed dispensing device comprising a frame part, a shaft journalled in the frame part and continuously driven during operation of the device, an eccentric throw formation on the shaft, a pitman engaged with said eccentric throw formation, a swinging link extending substantially perpendicularly to the axis of the pitman and pinned to one end thereof at its one extremity and to the frame part at its other extremity, a seed pick-up nozzle supported on the pitman for reciprocation between a seed pick-up and a discharge point, a collector for discharged seeds located closely adjacent the said discharge point, and a bellows continuously open to the nozzle and having its one side secured to the frame part and its other side mechanically connected to the pitman.

7. In a seed dispensing service comprising a wheel-supported casing and a seed container in the casing, a shaft journalled in the casing to be driven from a supporting wheel and having an eccentric throw device, a nozzle operatively connected to the eccentric throw device for movement between a seed pick-up and a seed discharge point, a collector for discharged seeds located adjacent the discharge point, and a bellows open to the nozzle and mechanically connected to the eccentric throw device for collapse and expansion in synchonism with the movement of the nozzle to the discharge and pick-up points respectively.

WALLACE JAMES PARKER.

REFERENCES CITED

The following references are of record in the file of this patent:

UNITED STATES PATENTS

| Number | Name | Date |
|---|---|---|
| 647,448 | Israel | Apr. 10, 1900 |
| 792,958 | Bagger | June 20, 1905 |
| 1,109,500 | Anderson | Sept. 1, 1914 |